United States Patent
Na Nakorn et al.

(10) Patent No.: US 12,430,691 B2
(45) Date of Patent: *Sep. 30, 2025

(54) SYSTEMS, METHODS, AND APPARATUSES FOR IMPLEMENTING USER CUSTOMIZABLE POLICIES FOR REVENUE RECOGNITION

(71) Applicant: Stripe, Inc., San Francisco, CA (US)

(72) Inventors: Tanin Na Nakorn, San Francisco, CA (US); Ji Huang, San Francisco, CA (US); Atikh Bana, San Francisco, CA (US); Xu Rui, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 48 days.

This patent is subject to a terminal disclaimer.

(21) Appl. No.: 18/241,656

(22) Filed: Sep. 1, 2023

(65) Prior Publication Data

US 2024/0062312 A1 Feb. 22, 2024

Related U.S. Application Data

(63) Continuation of application No. 17/479,757, filed on Sep. 20, 2021, now Pat. No. 11,776,066.

(51) Int. Cl.
*G06Q 40/12* (2023.01)
*G06Q 10/063* (2023.01)

(52) U.S. Cl.
CPC ........... *G06Q 40/12* (2013.12); *G06Q 10/063* (2013.01)

(58) Field of Classification Search
None
See application file for complete search history.

(56) References Cited

U.S. PATENT DOCUMENTS

| 9,817,991 | B2* | 11/2017 | Boncha | G06F 21/6218 |
|---|---|---|---|---|
| 10,467,705 | B1* | 11/2019 | Jin | G06Q 40/00 |
| 2002/0178077 | A1* | 11/2002 | Katz | G06Q 10/10 |
| | | | | 705/7.36 |
| 2006/0229896 | A1* | 10/2006 | Rosen | G06Q 10/1053 |
| | | | | 705/321 |
| 2009/0037265 | A1* | 2/2009 | Moona | G06Q 30/0236 |
| | | | | 705/14.35 |
| 2010/0287034 | A1* | 11/2010 | Pope | G06Q 10/0631 |
| | | | | 705/7.31 |

(Continued)

*Primary Examiner* — Fateh M Obaid
(74) *Attorney, Agent, or Firm* — BAKERHOSTETLER

(57) ABSTRACT

Systems, methods and apparatuses for implementing user customizable policies for revenue recognition are described. In some embodiments, user inputs are received from a merchant that specify components of a set of revenue recognition rules to apply to transactions of the merchant on a per transaction basis, wherein each revenue recognition rule specifies a set of conditions to be met to trigger its application, a rule identifier, status, and whether the revenue recognition rule is applied at least one of: a specified product; a specified invoice; a specified customer; a specified payment; a specified refund; and a specified dispute. The user inputs are converted into rules to enable the rules to be matched to the transactions. A transaction is tracked by a server computer system. One or more applicable revenue recognition rules are identified to apply to the transaction, and revenue recognition is performed against the transaction.

20 Claims, 10 Drawing Sheets

(56) References Cited

U.S. PATENT DOCUMENTS

| | | | |
|---|---|---|---|
| 2010/0306249 A1* | 12/2010 | Hill | G06F 16/9535 |
| | | | 707/769 |
| 2011/0196761 A1* | 8/2011 | Callahan | G06Q 10/10 |
| | | | 715/764 |
| 2012/0130853 A1* | 5/2012 | Petri | G06Q 30/0609 |
| | | | 705/26.35 |
| 2014/0156343 A1* | 6/2014 | Olsen | G06Q 30/0201 |
| | | | 705/7.29 |
| 2017/0236084 A1* | 8/2017 | Sullivan | H04L 67/10 |
| | | | 705/7.26 |
| 2017/0236218 A1* | 8/2017 | Shak | G06Q 40/12 |
| | | | 705/30 |

* cited by examiner

× | Add revenue recognition rule

Rule details

Name

[Rule name]

Apply to ☐
☑ Customers

You must also select either invoices or other payments.

501 —— Customer email ◇  contains  all ◇  of the following:

stripe.com
testuser
testing     —— 503

502

☐ Invoices
☐ Other payments

Revenue treatment

Treatment

[Select a treatment... ◇]                    Allocation
                                             [100% ◇]

Add Treatment

Effective period

Start                            End

Add rule — 310

FIG. 5

× | Add revenue recognition rule                                    [Add rule]—310

Rule details

Name

[Rule name]

Apply to ☐
☑ Customers
☑ Invoices

[Line item amount ◇] is [between ◇]
601—
[$ 0.00] [USD ◇]   and   [$ 0.00] [USD ◇]
603—              602↲
                         604
☐ Other payments

Revenue treatment

Treatment
[Select a treatment... ◇]

Add Treatment

Allocation
                              [100% ◇]

Effective period

Start              End
[All past dates ◇]  —  [Idefinite ◇]

FIG. 6

Revenue recognition rules ← 701

Custom
Custom rules are applied to specified products, invoices, customers or other payments

[ ≡ Change rule order ]  [ + Add rule ]

| | NAME | STATUS | APPLIED TO | LAST UPDATED |
|---|---|---|---|---|
| 1 | Exclude test customers | Active | Invoices | Jun 1, 2021, 12:22 PM |
| 2 | Amortize all standalone charges over a month | Active | Other payments | Jun 1, 2021, 12:22 PM |
| 3 | Amortize standalone charge over one year for certain customers | Active | Other payments | Jun 1, 2021, 12:23 PM |
| 4 | Exclusion based on line item description | Active | Invoices | Jun 1, 2021, 12:29 PM |
| 5 | Exclude 20% of a standalone charge using a specific amount and currency | Active | Other payments | Jun 1, 2021, 12:29 PM |
| 6 | Exclude 20% of an invoice line item using a specific amount and currency | Active | Invoices | Jun 1, 2021, 12:24 PM |
| 7 | 100% passthrough fee | Active | Invoices | Jun 1, 2021, 12:24 PM |
| 8 | Defer on paid instead of finalization | Active | Invoices | |

Default
Default rules are applied to all transactions, unless a custom rule is matched

| | NAME | STATUS | APPLIED TO | LAST UPDATED |
|---|---|---|---|---|
| 1 | Recognize upon payment | Active | Other payments | — |
| 2 | Amortize over service period | Active | Invoices | — |

SYSTEMS, METHODS, AND APPARATUSES FOR IMPLEMENTING USER CUSTOMIZABLE POLICIES FOR REVENUE RECOGNITION

RELATED APPLICATIONS

This application is a continuation of U.S. patent application Ser. No. 17/479,757, filed Sep. 20, 2021. The disclosure of the aforementioned application is incorporated by reference herein in its entirety.

FIELD OF THE INVENTION

Embodiments of the present invention relate to the field of distributed systems; more particularly, embodiments of the present invention relate to performing revenue recognition on commercial transactions.

BACKGROUND OF THE INVENTION

In accounting, different transactions may require different ways of recognizing revenue. For example, one transaction may recognize revenue wholly in one month, while another transaction may amortize its revenue over three months.

A problem arises in the context of revenue recognition when a payment processor performs a number of transactions. If the transaction being handled by the payment processor does not specify revenue recognition policy information about how to recognize revenue with respect to the transaction, there is no additional way to which the revenue can be recognized except via a manual process for that transaction. As the number of transactions handled by payment processes and other similar financial organizations have grown to millions and millions, the potential of having to do manual revenue recognition is not possible and scalable manners of revenue recognition that are sealable for an accountant are needed.

SUMMARY

Systems, methods and apparatuses for implementing user customizable policies for revenue recognition are described. In some embodiments, a method comprises: tracking, by a network commerce system, a plurality of transactions; determining one or more revenue recognition rules of a plurality of revenue recognition rules that applies to each transaction of the plurality of transactions based on results of matching performed between conditions of each of the plurality of revenue recognition rules and one or more characteristics of said each transaction, the conditions of each rule including an effective time period during which individual transactions are subject to the rule; and automatically performing revenue recognition for each transaction according to one of the one or more revenue recognition rules determined to apply to said each transaction using based on results of matching conditions of one revenue recognition rule and the one or more characteristics of said each transaction.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 5 is an example of a user interface element enabling a user to specify a customer condition.

FIG. 6 is a flow diagram of another embodiment of a process for

FIG. 7 illustrates a user interface displaying an example list of rules.

FIG. 8 illustrates an example of a user interface window that is displayed by which a user can change the order of the rules in the revenue recognition rules list.

DETAILED DESCRIPTION

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, to avoid obscuring the present invention.

Methods and apparatuses for recognizing revenue are described. In some embodiments, revenue recognition is performed by a payment processor. The payment processor may comprise of one or more payment processing systems, examples of which are described in more detail below. In alternative embodiments, the revenue recognition is performed by other processing systems of other financial institutions or partners. In some embodiments, the payment processor or the other processing systems are part of a commerce platform environment.

Figure 1:
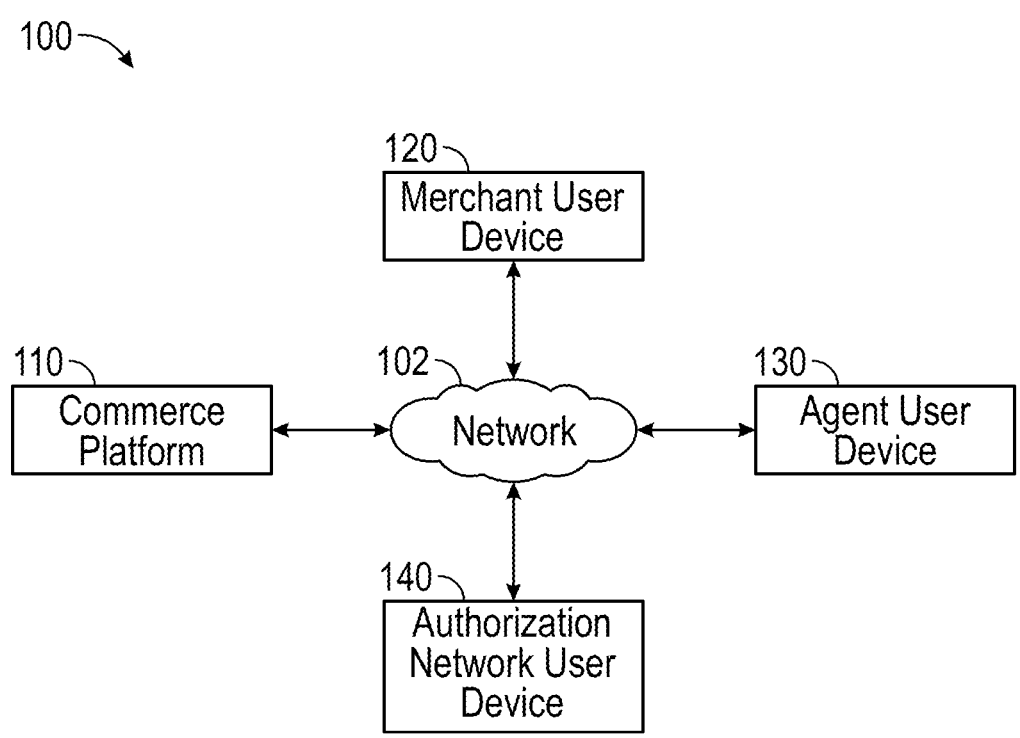
FIG. 1 is a block diagram of an exemplary system architecture for a commerce platform.

FIG. 1 is a block diagram of an exemplary system 100 architecture for a commerce platform environment. In some embodiments, system 100 includes a commerce platform 110, a merchant user device 120, an agent user device 130, and an authorization network user device 140. In some embodiments, user devices (e.g., devices 120, 130, and 140) may be mobile computing devices, such as a smartphone, tablet computer, smartwatch, etc., as well computer systems, such as a desktop computer system, laptop computer system, server computer systems, etc. The commerce platform 110 may also be one or more computing devices, such as one or more server computer systems, desktop computer systems, etc.

The commerce platform 110, merchant user device 120, agent user device 130, and authorization network user device 140 may be coupled to a network 102 and communicate with one another using any of the standard protocols for the exchange of information, including secure communication protocols. In some embodiments, one or more of the commerce platforms 110, merchant user device 120, agent user device 130, and authorization network user device 140 may run on one Local Area Network (LAN) and may be incorporated into the same physical or logical system, or different physical or logical systems. Alternatively, the commerce platform 110, merchant user device 120, agent user device 130, and authorization network user device 140 may reside on different LANs, wide area networks, cellular telephone networks, etc. that may be coupled together via the Internet but separated by firewalls, routers, and/or other network devices. In some embodiments, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In some embodiments, commerce platform 110 provides financial processing services to one or more of merchant user device 120, agent user device 130, and/or authorization network user device 140, such as managing accounts, running financial transactions, clearing transactions, performing payouts to agents, managing merchant and/or agent accounts, as well as other services typically associated with commerce platforms systems such as, for example, STRIPE™.

In some embodiments, commerce platform 110 comprises a number of software platforms that are compatible with each other. These platforms may include one or more frontend platforms and one or more backend platforms. The frontend platforms may include user interface code that is used to access services provided by one or more backend platforms. The software platforms may involve authenticating user information (e.g., username, passwords, login information, financial information, etc.). The software platforms may involve creating tokens and maintaining and verifying publishable (non-secret) keys and secret keys in a manner well-known in the art, or providing a Stripe.js enabled Payment Form using standard web technologies, such as described in U.S. Pat. Nos. 10,134,036, 9,830,596, and 9,824,354. The software platforms may involve authorizing or validating payment information, approving or declining transactions, and settling any charges that are made. The software platforms may involve browsers.

Revenue Recognition

In some embodiments, revenue recognition is performed using a set of revenue recognition rules and are applied on a per transaction basis. Setting up revenue recognition rules in a scalable way produces a more accurate revenue recognition report for transactions that are handled with little effort.

In some embodiments, transactions may involve one or more of an invoice, a charge, a refund, or result from resolution of a dispute. Examples of such transactions are provided below. The techniques described herein are not limited to these transaction examples and other transactions are well-known to those skilled in the art for which the revenue recognition techniques may be used.

Illustration #1:
If there is an invoice with two line items:
1. Product A $100.00
2. Sales tax $9.00
The merchant can specify a rule to categorize the second line item as a tax by creating a rule:
Name: the tax rule
Condition: invoice line item's description contains "tax"
Treatment: 100% should be categorized as tax liability.
Illustration #2:
If there is a charge of $100, and the merchant would like to categorize $90 as revenue and $10 as a passthrough fee.
The merchant can specify a rule to categorize $10 as passthrough fee by creating a rule:

Name: Passthrough fee
Condition: all charges
Treatment:
1. 90% should be revenue
2. 10% should be passthrough fee As shown above, in some embodiments, the revenue recognition rules enable categorizing a tax invoice line item as tax liability and enabling the booking of passthrough fees. In some embodiments, other rules enable excluding transactions from certain customers. Thus, the revenue recognition rules enable a user to support different transaction scenarios that do not align with the default behaviors.

While these examples illustrate that a revenue recognition rule applies to one type of transaction, in some embodiments, a revenue recognition rule may apply to multiple types of transactions or multiple recognition rules may apply to the same transaction. For example, in some embodiments, these transactions are categorized into two categories: an invoice line item; and other payments (i.e., a payment that is not associated with an invoice). Further examples of these are discussed in more detail below.

In some embodiments, a revenue recognition rule comprises three components: one or more conditions (e.g., "apply to"), revenue treatments, and an effective period. The conditions specify which transactions (e.g., charges, invoice line items) to which a rule should apply. For example, a user can specify that a rule only applies to transactions whose descriptions contain the word "tax". In some embodiments, a rule may have multiple conditions that must be met by a transaction to apply the revenue recognition rule. In some embodiments, a transaction fulfills the condition requirement of a rule when all the conditions are true. In some embodiments, the determination of whether all conditions are true is based on matching the conditions with transaction attributes.

The effective period specifies the time period within which a transaction must occur in order for a rule to apply. For an invoice line item, if its invoice's finalization time falls within the specified effective period, then the invoice line item fulfills the effective period requirement. For a charge, if its corresponding balance transaction's creation time falls within the specified effective period, then the charge fulfills the effective period requirement.

In some embodiments, for a rule to apply to a transaction, the transaction must fulfill both the effective period and condition requirement. By having conditions and an effective time period, the revenue recognition system enables the flexibility in matching certain transactions (e.g., invoices, other payments, etc.).

When a transaction fulfills both the effective period and condition requirement, a set of defined treatments is applied. In some embodiments, a treatment specifies how to recognize revenue associated with a transaction. In some embodiments, a treatment consists of the treatment's type and the allocation percentage. The allocation percentage specifies how much of the transaction amount to which the treatment's type should apply, while the treatment's type specifies how the amount should be treated.

In some embodiments, the treatment types are one of the following: 1) defer and recognize revenue at a specified time (in some embodiments, this is only applicable to charges); 2) categorize the amount as passthrough fees; categorize the amount as tax; exclude the amount from revenue; amortize the amount over a specified period (in some embodiments, this is applicable to charges only); amortize the amount over an invoice line item's service period (in some embodiments, this is applicable to invoice line items only). Note that the techniques described herein are not limited to these treatments and other treatments may be used.

In some embodiments, a rule can contain multiple treatments with their allocations adding up to 100%. For example, in some embodiments, a treatment may specify if the revenue associated with the transaction should be allocated 20% to a tax and 80% to be amortized over a three-month period of time. Allowing a rule to apply multiple treatments enables flexibility and how each portion of a transaction's amount should be treated.

In some embodiments, revenue recognition rules are set up through a user interface (UI) that enables an individual to specify how to recognize revenue given a set of transactions that match certain conditions. For example, using the UI, an individual can specify that the amount is taxed or that the amount should be amortized over a predetermined period of time (e.g., 12 months, 3 months, 120 days, etc.).

In some embodiments, an individual can create multiple rules and can set the relative ordering in which the rules apply. If a transaction matches multiple rules, the system employs a priority scheme or hierarchy that determines which of the matching rules to apply to a particular transaction. In some embodiments, the priority scheme states that the matching rule with the highest rank (e.g., higher rule in a list) is chosen. The rule order enables the merchants to manage many rules in a simple way.

Figure 2:
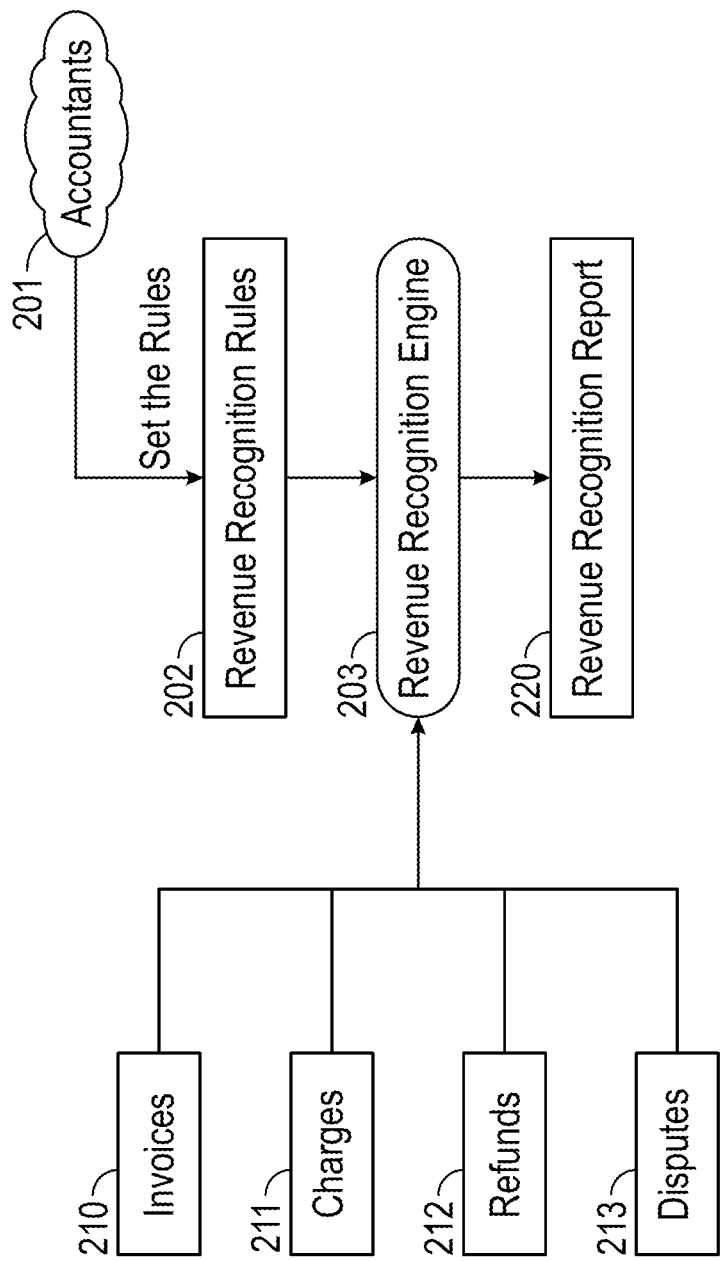
FIG. 2 is a data flow diagram of some embodiments of a process for recognizing revenue.

FIG. 2 is a data flow diagram of some embodiments of a process for recognizing revenue. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a network commerce system, such as, for example, described in FIG. 1. Referring to FIG. 2, the process begins with accountants or other individuals 201 setting up revenue recognition rules 202. The revenue recognition rules 202 specify how revenue is recognized for one or more of invoices, charges, refund or disputes. In essence, the revenue recognition rules implement revenue recognition policies.

Revenue recognition engine 203 receives the revenue recognition rules 202 and one or more of invoices to attend, charges 211, refunds to 212, and disputes 213, and applies revenue recognition rules 202 to those transactions. In some embodiments, revenue recognition in 203 determines whether one revenue recognition rule of revenue recognition rules 202 applies to an individual invoice of invoice 210, an individual charge of charges 211, an individual refund of refunds 212 or a dispute of disputes 213 based on a key word or words specified in the revenue recognition rule matching a line item in one of the transactions. If a match occurs, revenue recognition engine 203 performs the one or more treatments that are specified in the revenue recognition rule through the transaction.

In some embodiments, after revenue recognition engine 203 applies for revenue recognition rules 202, the revenue recognition engine 203 generates and outputs a revenue recognition report 220 that specifies a summary of the revenue recognition that is resulted by performing the revenue recognition rules 202. In some embodiments, revenue recognition engine 203 generates a revenue recognition report 220 for each merchant, customer or other customer of a payment processer or financial institution.

In some embodiments, revenue recognition rules 202 are set up by individuals 201 using a UI or other dashboard. In some embodiments the UI or dashboard may be accessed over a network connection.

Figure 3:
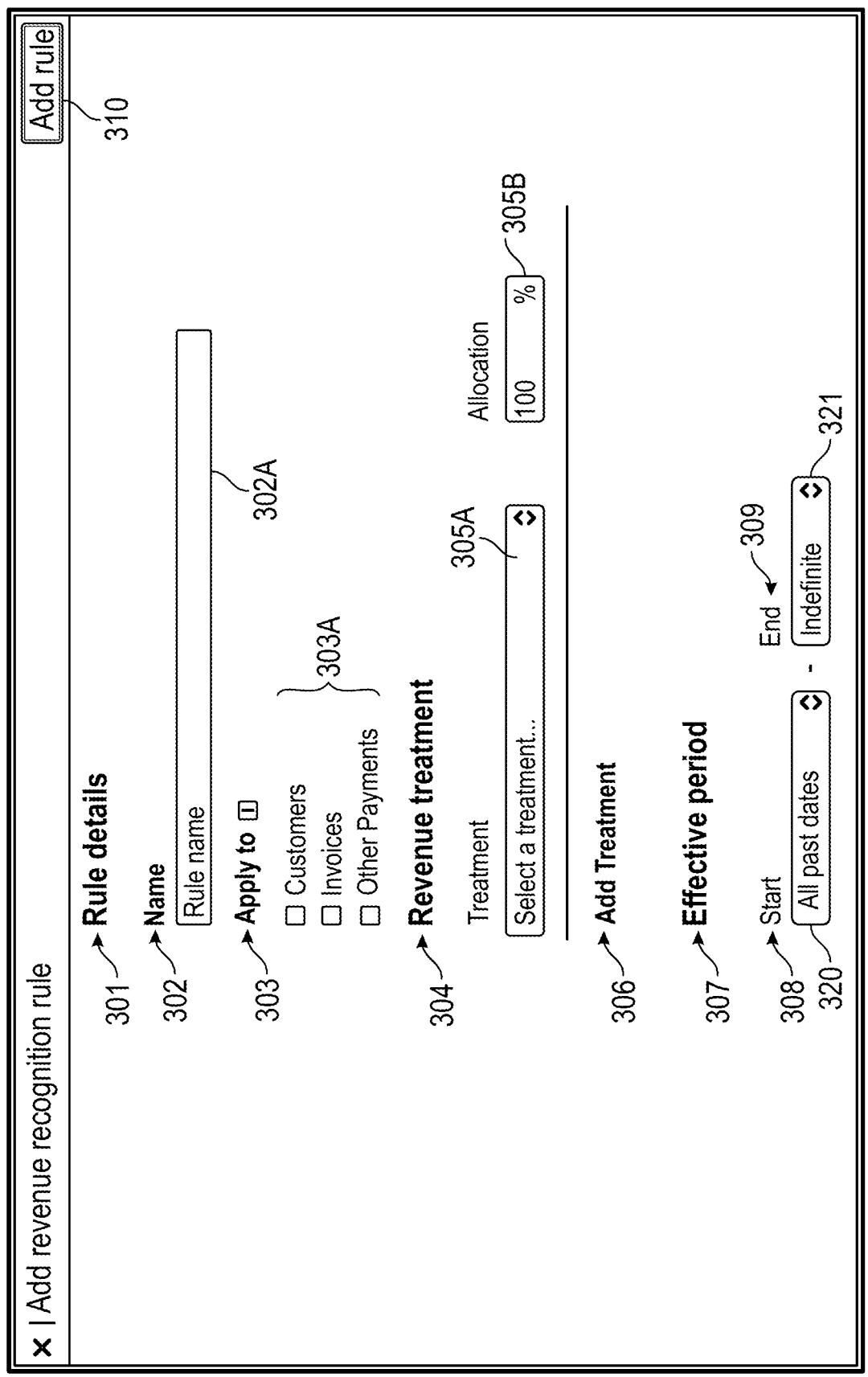
FIG. 3 illustrates some embodiments of a user interface page for creating a rule.

FIG. 3 illustrates some embodiments of a user interface page for creating a rule. Referring to FIG. 3, the user interface for creating a rule includes a number of graphical user elements that allow a user to specify rule details 301. In some embodiments, the rule details 301 includes a name 302 that includes a dialog box 302A by which the user can enter the name of a rule. The user interface also allows the user to specify which transaction the rule is applied to (303). In some embodiments, the user interface includes a checklist 303A that has a list of transaction types selectable by a user to indicate the types of transactions to which a rule may be applied. In some embodiments, the list includes customers, invoices, or other payments. The techniques disclosed herein are not limited to these categories of transactions and may include more types (or less types) of transactions, thereby enabling revenue recognition rules to applied to various other transactions. In some embodiments, the user is able to select one of the listed transaction types by selecting the box in front of the category on checklist 303A. In an alternative embodiments, a user is allowed to select two or more of the transaction types listed in checklist 303A.

The user interface of FIG. 3 also includes a revenue treatment area 304 where a user is allowed to specify the revenue treatment associated with a rule. Specifically, in some embodiments the user can select treatments from a list using drop down menu 305A along with the allocation percentages using dialog 305B. In some embodiments, the allocation percentage for all the treatments must equal 100%. Thus, if a user selects revenue to be recognized using multiple treatments, the percentages of all the treatments must equal 100%.

Figure 4:
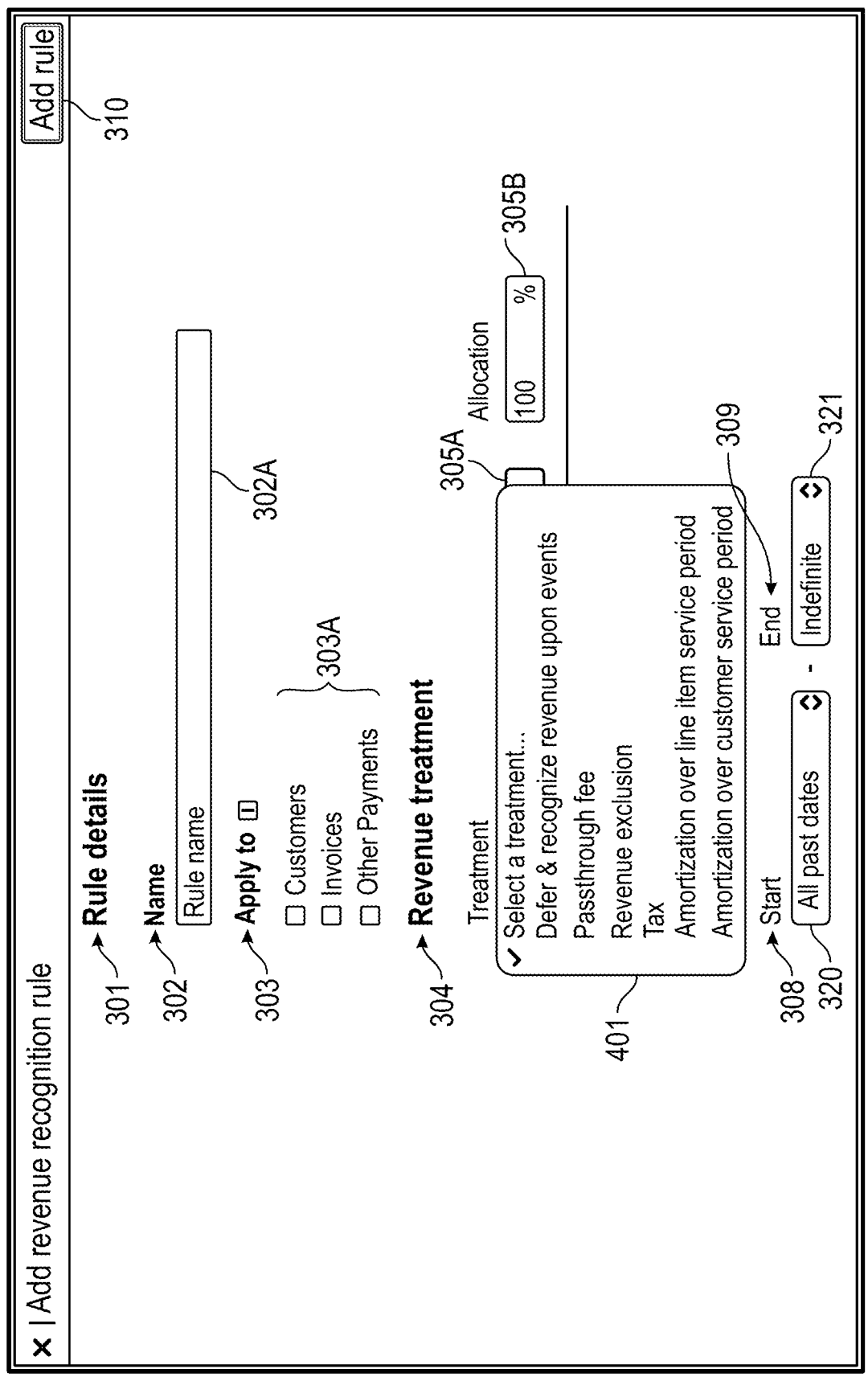
FIG. 4 illustrates an example of a dialog box by which various treatments may be selected.

In response to the user selecting the upper down arrows of the treatment selection drop down menu 305A, a drop-down menu is shown that specifies a list of different revenue recognition rules that may be applied. FIG. 4 illustrates an example of such a dialog box. Referring to FIG. 4, dialog box 401 is displayed in response to selection of treatment selection box 305A. In some embodiments, the different treatments that may be specified for a rule include differ and recognize revenue upon an event, passthrough fee, revenue exclusion, tax, amortization over line-item service period, and amortization over custom service. These are all well-known accounting revenue recognition categories. In some embodiments, additional revenue recognition treatments may be included in the list; alternatively, a subset of these revenue treatments may be specified in the list presented in the dialog box.

Referring back to FIG. 3, the user is allowed to specify multiple treatments. If the user desires to have multiple treatments, they may select add treatment button 306 which allows one or more additional treatments to be selected by a user and applied by the rule being created. In response to selecting with the add treatment button 306, another set of treatment drop-down menu 305A and allocation box 305B are displayed and the user is able to again select the newly displayed drop-down menu and select a particular treatment as well as allocation percentage. Note that in some embodiments, the allocation percentages must add up to 100%.

As part of creating a rule, the user interface allows a user to select the effective period 307 of the rule. Specifically, in some embodiments, the user is able to select the start period 308 and an ending period 309. In some embodiments, using the selection window 320, the user is enabled to select whether the effective period applies to all past dates, or only dates going forward in time. Using the selection window 321, the user is able to select the ending period of the rule is indefinite, or specified predetermined period of time by which the rule ends.

In some embodiments, if the user selects that a rule is to be applied to a customer in list 303A, the user is able to set additional conditions that must be meet for the customer in order for the rule to be applied to a particular transaction. FIG. 5 is an example of a user interface element enabling a user to specify a customer condition. Referring to FIG. 5, using up and down buttons of selection window 501, the user is able to condition the rule to apply to customers having a particular email address or customer identifier (ID). In alternative embodiments, selection window 501 includes other selections of customer attributes to identify to which customer(s) a rule is to be applied. Up and down buttons of selection window 502 allows that the user to specify whether one or all of the following set of conditions entered by the user in dialog box 503 must be met for the rule to apply. For example, if the user specifies "all" in selection window 502, then all the condition specified in dialog box 503 must be met for the rule to apply. Alternatively, if the user specifies "one or more" in in selection window 502, then then one or more of the conditions entered by the user in dialog box 503 need be met for the revenue recognition rule to apply to a particular transaction.

In some embodiments, if the user selects that the rule is applied to invoices using checklist 303A, the user interface allows a user to specify the transaction amount of a line item in an invoice that must be met in order for the rule to apply. In some embodiments, the amount is specified as a range identified between two different currency amounts. To do so, in some embodiments, when a user selects the invoices from checklist 303A, additional user interface elements are displayed to allow the user to specify the end points of the range for the line item amount. FIG. 6 illustrates an example of additional user interface elements that are displayed on a user interface to enable a user to specify the amount of an invoice line item that must be met for a rule to apply. Referring to FIG. 6, in some embodiments, the selection window 601 allows the user to specify that a line-item amount is a condition in the rule, line-item description, types of line items (e.g., from subscription or created directly), and line item's metadata. Selection window 602 specifies whether the line-item amount must be between two amounts specified by a user in dialog boxes 603 and 604. That is, if the rule is conditioned to line item not being within a currency range (e.g., a dollar range amount), windows 603 and 604 enable a user to specify range of those amounts. In some embodiments, up and down buttons of selection window 602 allows a user to specify than the line-item amount must be above or below a particular amount specified by a user. In such a case, select window 603 allows the user to enter the amount that the line item must be above or below for the revenue recognition rule to apply.

Referring back to FIG. 3, once the user has specified the name of the rule, the transactions to which the rule is applied, the revenue treatments for the rule and the effective period of the rule, the user may add the newly created rule to the revenue recognition list by clicking add rule button 310. In response therefore, the rule is added to the list of rules.

FIG. 7 illustrates a user interface displaying an example list of rules. In some embodiments, a new rule is added to the end of the list of rules. In some embodiments, the UI includes a button or other graphical user element on another user interface (e.g., web page) that may be selected by user to display the revenue recognition rules page shown in FIG. 7.

Referring to FIG. 7, revenue recognition rules 701 are shown broken down into two groups, namely custom revenue recognition rules 710 and default recognition rules 720. Custom revenue recognition rules 710 are rules that apply to specified products, invoices, customers or other payments that are handled by a payment processor or other financial institution, while default revenue recognition rules 720 are applied all other transactions by the revenue recognition engine unless a custom rule specified in custom revenue recognition rules 710 matches the transaction. In FIG. 7, custom revenue recognition rules 710 are numbered 1-8. Note that there is no requirement that in payment process or other financial institution include eight revenue recognition rules, more or less than eight revenue recognition rules may be used. Similarly, while only two default revenue recognition rules 720 are shown and numbered 1 and 2, there may be more or less default revenue recognition rules.

In some embodiments, each of custom revenue recognition rules 710 includes a name 702, status 703 (e.g., active, inactive, etc.), an indication of the specific type of transaction to which the rule is applied (e.g., applied to) 704, and an indication 705 of when the rule was last updated. In some embodiments, the user is specified a name 702 of revenue recognition rule. In some embodiments, revenue recognition rules can have a status of active in which the rule is currently in place or inactive where the rule is not currently being utilized by the revenue recognition engine.

In some embodiments, the applied to indication 704 specifies that the revenue recognition rule applies to invoices or other payments. However, in alternative embodiments, the applied to 704 may specify that the revenue recognition rule is applied to either an invoice, a charge, a refund, and/or a dispute. In some embodiments, the default recognition rule is 720 specified in the revenue recognition rules 701 have similarly have similar names 712, status 713, applied to 714 and a time when they are last updated 715.

Since there can be more than one rules, one transaction may fulfills the requirements of more than one rules. When this situation happens, the order of the rules comes into play. In some embodiments, the rule with the highest rank (in other words, lowest order) will be selected for application to the transaction. In some embodiments, the numbering of custom revenue recognition rules 310 and default revenue recognition 320 represents the order in which they are applied to individual transactions in situations in which a transaction (e.g., an invoice, other payment, etc.) matches the conditions and effective period of more than one rule. For example, if an invoice matched custom revenue recognition rules 1, 4 and 6, the revenue recognition engine would apply revenue recognition rule 1 to the invoice because rule number 1 is the highest priority rule and takes precedence.

In some embodiments, the priority, or hierarchy, in which the rules are applied may be changed. In some embodiments, the user interface page displaying revenue recognition rules 701 includes a change rule order button 730 that enables an individual to change the order in which they are applied. For example, after a rule is added to custom revenue recognition rules 710 and is added to the end of the rules list, a user may wish to reorder the rules. In such a case, the user selects the change rule order button 730 in FIG. 7.

Figure 8:
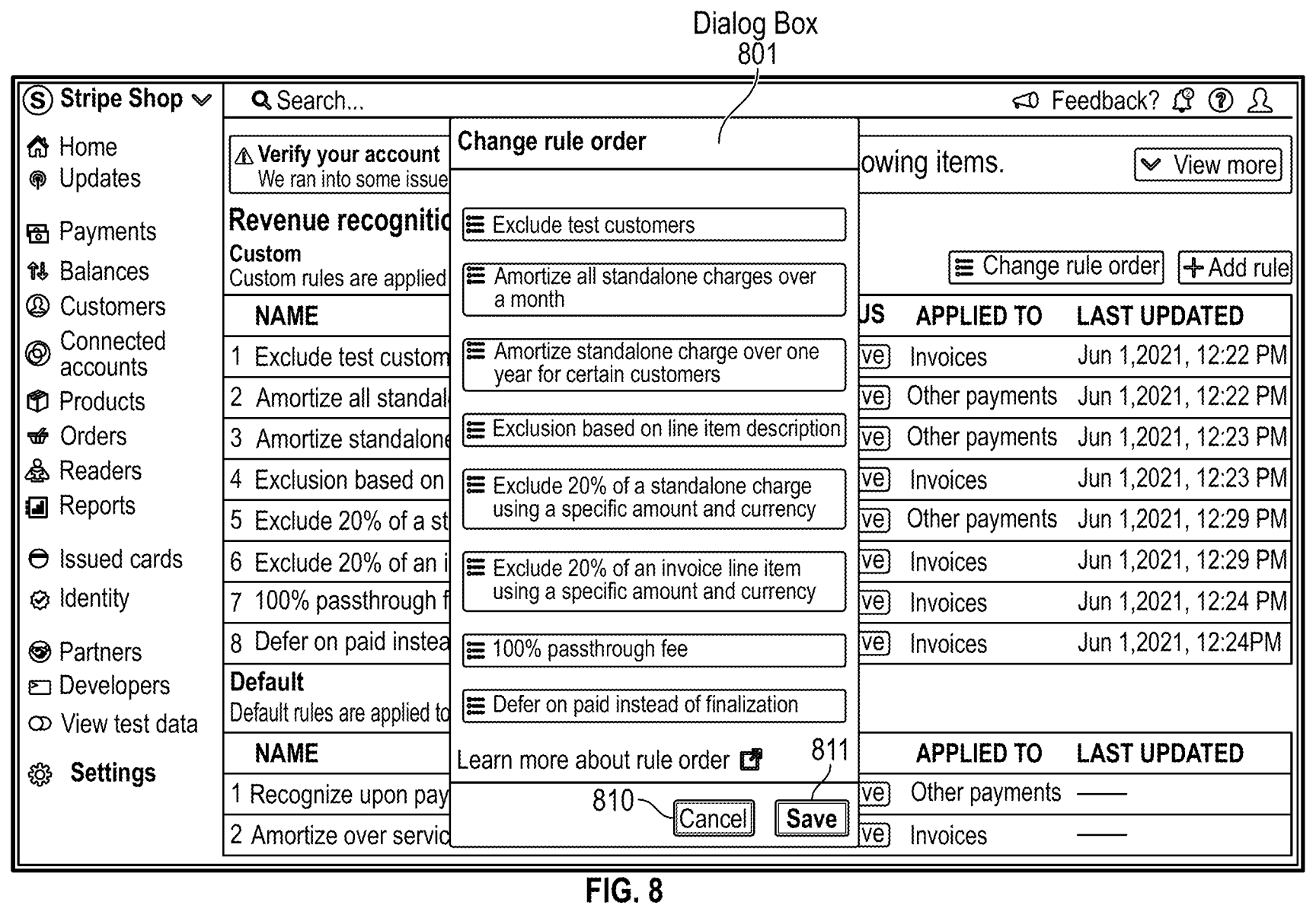

In response to selecting the rule order button 730, a user interface window (e.g., dialog box, etc.) is displayed by which a user can change the order of the rules in the revenue recognition rules list. FIG. 8 illustrates an example of a user interface window that is displayed by which a user can change the order of the rules in the revenue recognition rules list. Referring to FIG. 8, a dialog box 801 is displayed showing all the current rules that are in place. In this case, all the custom rules shown in FIG. 7 are displayed and the customer revenue recognition rules are numbered 1-8.

Using dialog box 801, a user is able to select and reorder the rules. In some embodiments, the user is able to drag and drop the individual rules into different locations in the list in order to change their priority. In alternative embodiments, the user can select one of the rules and be able to specify a new number for the rule in the list, thereby causing a reordering of the rules in the list. After changing the order of the rules in dialog box 801, the user is able to save the new rule order by clicking on or selecting the save button 811 or might cancel the change in rule order by selecting cancel button 810.

Referring back to FIG. 7, the user interface displaying revenue recognition rules 701 also includes an add rule button 740 that enables the user to add one or more additional rules to custom revenue recognition rules list 710 or the default revenue recognition rules 720. In some embodiments, in response to selecting add rule button 740, the user interface of FIG. 3 is displayed to the user and is used as described above.

Revenue Recognition Rule Examples

The following are examples of revenue recognition rules.

1) Categorize a tax line item (e.g., created by Avalara)—In order to categorize a tax line item, you can set one rule like below:

| Components | Value |
|---|---|
| Apply to | Invoices |
| | Line item description contains all of the following: |
| | AvaTax |
| Effective period | — |
| Treatments | Tax (100%) |

If there is a $10 invoice line item whose description is "Sales Tax calculated by AvaTax", and the invoice is finalized in April, you would see the account balances as below:

| Account | April |
|---|---|
| AccountsReceivable | $10 |
| TaxLiability | $10 |

2) Book a 10% passthrough fee—In order to categorize 10% of an amount as a passthrough fee, you can set one rule like below:

| Components | Value |
|---|---|
| Apply to | Invoices |
| | All line items: |
| Effective period | — |
| Treatments | Amortization over line item service period (90%) |
| | Passthrough fee (10%) |

If there is a $100 invoice line item (without a service period) finalized in April, the account balances as below:

| Account | April |
|---|---|
| AccountsReceivable | $100 |
| TaxLiability | $90 |
| PassthroughFees | $10 |

3) Exclude transactions from a test customer—In order to exclude all the standalone payments from a test customer, you can set one rule like below:

| Components | Value |
|---|---|
| Apply to | Customers |
| | Customer email contains all of the following: |
| | test@stripe.com |
| | Other payments |
| | All other payments |
| Effective period | — |
| Treatments | Revenue exclusion (100%) |

A standalone payment from the customer whose email is test@stripe.com would be excluded from the report completely.

4) Amortize standalone payments yearly and monthly based on customers. In this example, the rule is designed to (1) amortize standalone payment from a small set of customers (e.g., cus_AAA and cus_BBB) over one year and (2) amortize the remaining standalone payments over one month. In this instance, two rules can be made and the order of the rules are utilized as shown below:

Rule 1: Amortize Standalone Payments Over One Year

| Components | Value |
|---|---|
| Apply to | Customers |
| | Customer ID matches any of the following: |
| | cus_AAA |
| | cus_BBB |
| | Other payments |
| | All other payments |
| Effective period | — |
| Treatments | Amortize over custom service period (100%) |
| | Amortize starting 0 days from paid time over 1 year |

Rule 2: Amortize Standalone Payments Over One Month

| Components | Value |
|---|---|
| Apply to | Other payments |
| | All other payments |
| Effective period | — |
| Treatments | Amortize over custom service period (100%) |
| | Amortize starting 0 days from paid time over 1 month |

A standalone payment from cus_AAA or cus_BBB would match Rule 1, and its revenue would be amortized over one year. A standalone payment from any other customer would match Rule 2, and its revenue would be amortized over one month.

Example Processing Flow

Figure 9:
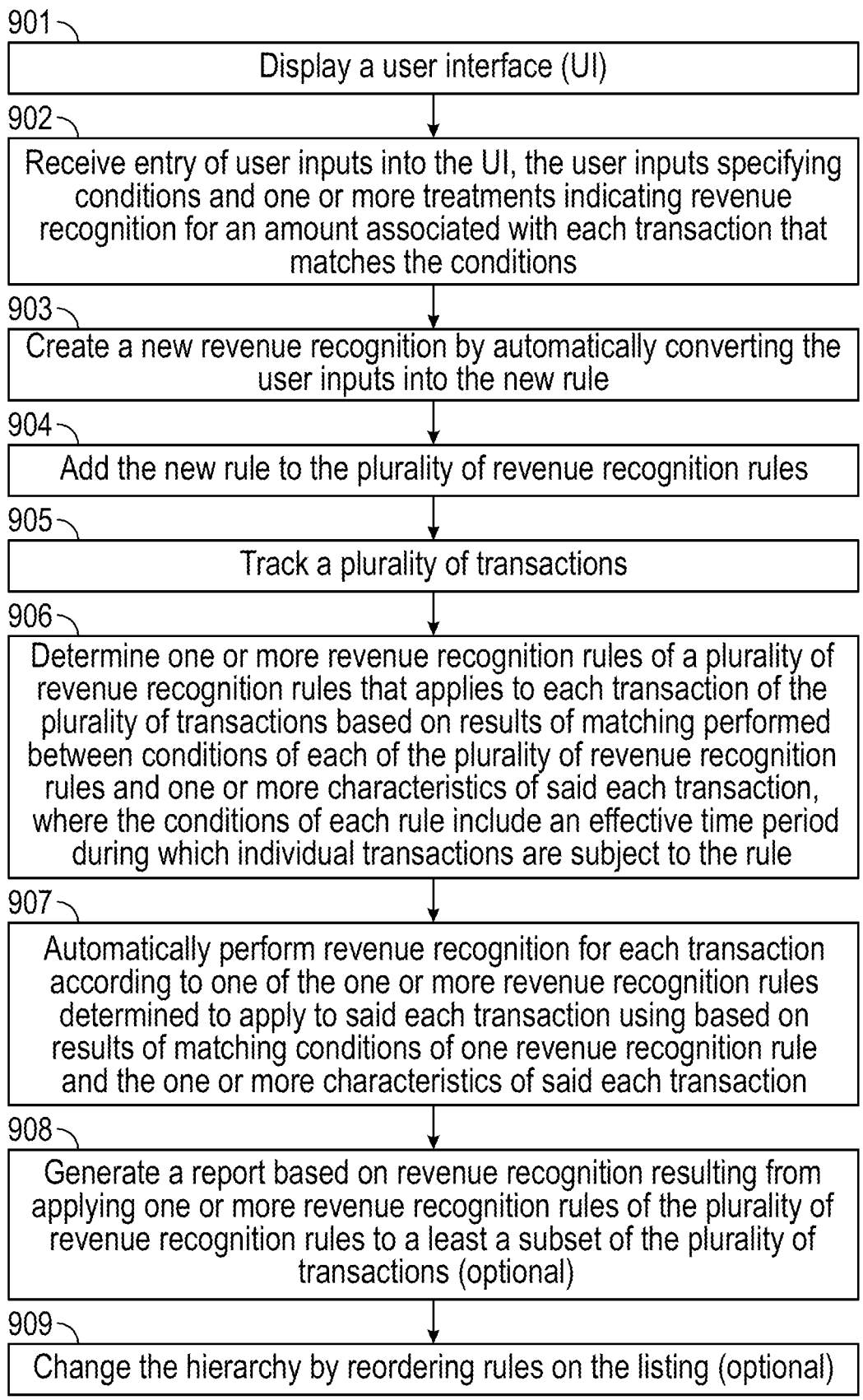
FIG. 9 is a flow diagram of another embodiment of a process for performing revenue recognition.

FIG. 9 is a flow diagram of another embodiment of a process for performing revenue recognition. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three. In some embodiments, the process is performed by a network commerce system, such as, for example, described in FIG. 1. This may involve using a revenue recognition engine as describe above in FIG. 2.

Referring to FIG. 9, the process begins by with revenue recognition rule creation. In some embodiments, rule creation begins with processing logic displaying a rule creation user interface (UI) (processing block 901).

With the user interface, processing logic receives entry of user inputs (processing block 902). In some embodiments, the user inputs specifying conditions and one or more treatments indicating revenue recognition for an amount associated with each transaction that matches the conditions. In some embodiments, the transactions may include one or more invoices, charges, refunds, payments related to disputes. In one embodiment, at least one of the conditions of at least one rule specifies one or more keywords in a line item on an invoice. In some embodiments, at least one revenue recognition rule of the plurality of revenue recognition rules includes two or more treatments that specify total revenue of a transaction matching conditions of said at least revenue recognition rule is allocated in two or more different revenue recognition allocations. In other words, the user inputs specify revenue is treated with at least two allocations of revenue when a transaction matches the conditions of at least one rule of the plurality of revenue recognition rules.

Using the user inputs, processing logic creates a new revenue recognition by automatically converting the user inputs into the new rule (processing block 903) and adds the new rule to a plurality of revenue recognition rules (processing block 904).

After one or more revenue recognition rules have been created, revenue recognition may be applied to transactions using created revenue recognition rules may occur. To that end, processing logic tracks a plurality of transactions (processing block 905) and determines one or more revenue recognition rules of a plurality of revenue recognition rules that applies to each transaction of the plurality of transactions based on results of matching performed between conditions of each of the plurality of revenue recognition rules and one or more characteristics of said each transaction (processing block 906). In some embodiments, the conditions of each rule include an effective time period during which individual transactions are subject to the rule.

After determining one or more revenue recognition rules of a plurality of revenue recognition rules that applies to each transaction, processing logic automatically performs revenue recognition for each transaction according to one of the one or more revenue recognition rules determined to apply to said each transaction using based on results of matching conditions of one revenue recognition rule and the one or more characteristics of said each transaction (processing block 907).

In one embodiment, automatically performing revenue recognition for each transaction comprises determining two or more revenue recognition rules of the plurality of revenue recognition rules applies to one transaction of the plurality of transactions and selecting a single revenue recognition rule from the two or more revenue recognition rules to apply to the one transaction based on a hierarchy. In one embodiment, the hierarchy is specified according to order number in an ordered listing of the rules in the plurality of revenue recognition rules.

Processing logic may generate one or more reports based on revenue recognition resulting from applying one or more revenue recognition rules of the plurality of revenue recognition rules to a least a subset of the plurality of transactions (processing block 908).

During or before performing revenue recognition on transaction, in cases more than one revenue recognition rules exist, processing logic may change the hierarchy or priority associated with the rules processing block 909). In one embodiment, this is performed by reordering rules on the listing. In some embodiments, changing the hierarchy changes which revenue recognition rules are applied to transactions in cases where multiple revenue recognition rules are applicable to an individual transaction.

An Example Computer System

Figure 10:
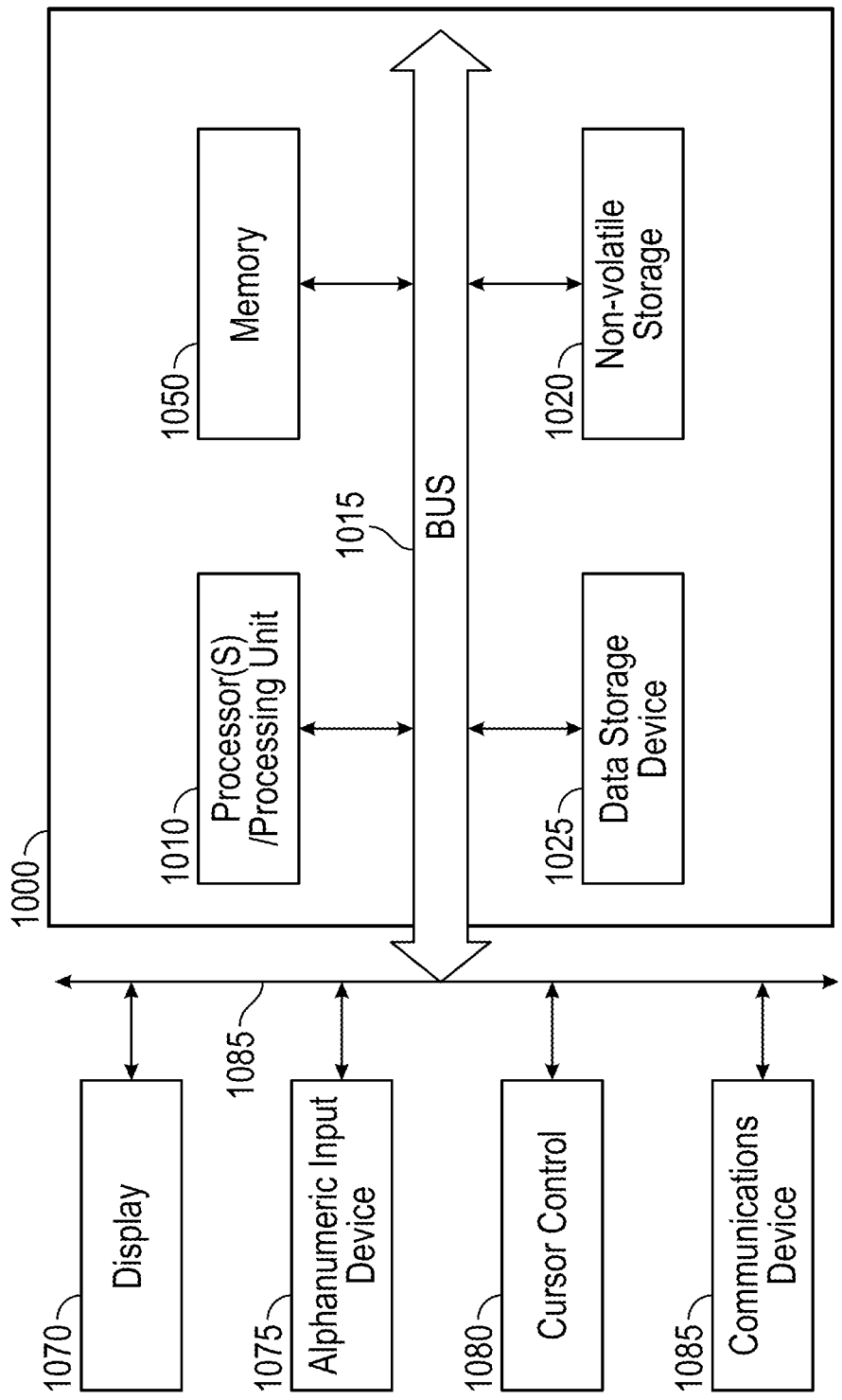
FIG. 10 is one embodiment of a computer system that may be used to support the systems and operations discussed herein.

FIG. 10 is one embodiment of a computer system that may be used to support the systems and operations discussed herein. It will be apparent to those of ordinary skill in the art, however, that other alternative systems of various system architectures may also be used.

The data processing system illustrated in FIG. 10 includes a bus or other internal communication means 1015 for communicating information, and a processor(s) 1010 coupled to the bus 1015 for processing information. The system further comprises a random-access memory (RAM) or other volatile storage device 1050 (referred to as memory), coupled to bus 1015 for storing information and instructions to be executed by processor 1010. Main memory 1050 also may be used for storing temporary variables or other intermediate information during execution of instructions by processor(s) 1010. The system also comprises a read only memory (ROM) and/or static storage device 1020 coupled to bus 1015 for storing static information and instructions for processor 1010, and a data storage device 1025 such as a magnetic disk or optical disk and its corresponding disk drive. Data storage device 1025 is coupled to bus 1015 for storing information and instructions.

The system may further be coupled to a display device 1070, such as a light emitting diode (LED) display or a liquid crystal display (LCD), coupled to bus 1015 through bus 1065 for displaying information to a computer user. An alphanumeric input device 1075, including alphanumeric and other keys, may also be coupled to bus 1015 through bus 1065 for communicating information and command selections to processor 1010. An additional user input device is cursor control device 1080, such as a touchpad, mouse, a trackball, stylus, or cursor direction keys coupled to bus 1015 through bus 1065 for communicating direction information and command selections to processor 1010, and for controlling cursor movement on display device 1070.

Another device, which may optionally be coupled to computer system 1000, is a communication device 1090 for accessing other nodes of a distributed system via a network. The communication device 1090 may include any of a number of commercially available networking peripheral devices such as those used for coupling to an Ethernet, token ring, Internet, or wide area network. The communication device 1090 may further be a null-modem connection, or any other mechanism that provides connectivity between the computer system 1000 and the outside world. Note that any or all of the components of this system illustrated in FIG. 10 and associated hardware may be used in various embodiments as discussed herein.

In some embodiments, processor(s) 1010 executes instructions to perform any of the operations described above including, but not limited to, performing deletion actions to delete a parent resource (e.g., as part of a deletion module being executed), access control to determine whether to give access to a resource (e.g., a user-facing resource, a child resource, etc.), grant or deny access to a resource, accessing parent resources and/or determined whether parent resources have been deleted, creating and storing parent deletion information, etc.

It will be appreciated by those of ordinary skill in the art that any configuration of the system may be used for various purposes according to the particular implementation. The control logic or software implementing the described embodiments can be stored in main memory 1050, mass storage device 1025, or other storage medium locally or remotely accessible to processor 1010.

It will be apparent to those of ordinary skill in the art that the system, method, and process described herein can be implemented as software stored in main memory 1050 or read only memory 1020 and executed by processor 1010. This control logic or software may also be resident on an article of manufacture comprising a computer readable medium having computer readable program code embodied therein and being readable by the mass storage device 1025 and for causing the processor 1010 to operate in accordance with the methods and teachings herein.

The embodiments discussed herein may also be embodied in a handheld or portable device containing a subset of the computer hardware components described above. For example, the handheld device may be configured to contain only the bus 1085, the processor 1010, and memory 1050 and/or 1025. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 1010, a data storage device 1025, a bus 1015, and memory 1050, and only rudimentary communications mechanisms, such as a small touchscreen that permits the user to communicate in a basic manner with the device. In general, the more special purpose the device is, the fewer of the elements need to be present for the device to function.

There is a number of example embodiments described herein.

Example 1 is a method comprising: tracking, by a network commerce system, a plurality of transactions; determining one or more revenue recognition rules of a plurality of revenue recognition rules that applies to each transaction of the plurality of transactions based on results of matching performed between conditions of each of the plurality of revenue recognition rules and one or more characteristics of said each transaction, the conditions of each rule including an effective time period during which individual transactions are subject to the rule; and automatically performing revenue recognition for each transaction according to one of the one or more revenue recognition rules determined to apply to said each transaction using based on results of matching conditions of one revenue recognition rule and the one or more characteristics of said each transaction.

Example 2 is the method of example 1 that may optionally include that at least one revenue recognition rule of the plurality of revenue recognition rules includes two or more treatments that specify total revenue of a transaction matching conditions of said at least revenue recognition rule is allocated in at least one revenue recognition allocations.

Example 3 is the method of example 1 that may optionally include displaying a user interface (UI); receiving entry of user inputs into the UI, the user inputs specifying conditions and one or more treatments indicating revenue recognition for an amount associated with each transaction that matches the conditions; creating a new revenue recognition rule by automatically converting the user inputs into the new rule; and adding the new rule to the plurality of revenue recognition rules.

Example 4 is the method of example 3 that may optionally include that at least one of the conditions of at least one rule specifies one or more keywords in a line item on an invoice.

Example 5 is the method of example 3 that may optionally include that the user inputs specify revenue is treated with at least one allocation of revenue when a transaction matches the conditions of at least one rule of the plurality of revenue recognition rules.

Example 6 is the method of example 1 that may optionally include generating a report based on revenue recognition resulting from applying one or more revenue recognition rules of the plurality of revenue recognition rules to at least a subset of the plurality of transactions.

Example 7 is the method of example 1 that may optionally include determining two or more revenue recognition rules of the plurality of revenue recognition rules applies to one transaction of the plurality of transactions; and selecting a single revenue recognition rule from the two or more revenue recognition rules to apply to the one transaction based on a hierarchy.

Example 8 is the method of example 1 that may optionally include that the hierarchy is specified according to order number in an ordered listing of the rules in the plurality of revenue recognition rules.

Example 9 is the method of example 8 that may optionally include that changing the hierarchy by reordering rules on the listing.

Example 10 is the method of example 1 that may optionally include that transactions of the plurality of transactions comprise one or more invoices, charges, refunds, payments related to disputes.

Example 11 is a system comprising: a memory to store instructions; and one or more processors coupled to the memory to execute the stored instructions to: track a plurality of transactions; determine one or more revenue recognition rules of a plurality of revenue recognition rules that applies to each transaction of the plurality of transactions based on results of matching performed between conditions of each of the plurality of revenue recognition rules and one or more characteristics of said each transaction, the conditions of each rule including an effective time period during which individual transactions are subject to the rule; and automatically perform revenue recognition for each transaction according to one of the one or more revenue recognition rules determined to apply to said each transaction using based on results of matching conditions of one revenue recognition rule and the one or more characteristics of said each transaction.

Example 12 is the system of example 11 that may optionally include that at least one revenue recognition rule of the plurality of revenue recognition rules includes two or more treatments that specify total revenue of a transaction matching conditions of said at least revenue recognition rule is allocated in two or more different revenue recognition allocations.

Example 13 is the system of example 11 that may optionally include that the one or more processors are operable to: display a user interface (UI); receive entry of user inputs into the UI, the user inputs specifying conditions and one or more treatments indicating revenue recognition for an amount associated with each transaction that matches the conditions; create a new revenue recognition by automatically converting the user inputs into the new rule; and add the new rule to the plurality of revenue recognition rules.

Example 14 is the system of example 13 that may optionally include that at least one of the conditions of at least one rule specifies one or more keywords in a line item on an invoice.

Example 15 is the system of example 13 that may optionally include that the user inputs specify revenue is treated with at least two allocations of revenue when a transaction matches the conditions of at least one rule of the plurality of revenue recognition rules.

Example 16 is the system of example 11 that may optionally include that the one or more processors are operable to: generate a report based on revenue recognition resulting from applying one or more revenue recognition rules of the plurality of revenue recognition rules to a least a subset of the plurality of transactions.

Example 17 is the system of example 11 that may optionally include that the one or more processors are operable to: determine two or more revenue recognition rules of the plurality of revenue recognition rules applies to one transaction of the plurality of transactions; and select a single revenue recognition rule from the two or more revenue recognition rules to apply to the one transaction based on a hierarchy.

Example 18 is the system of example 17 that may optionally include that the hierarchy is specified according to order number in an ordered listing of the rules in the plurality of revenue recognition rules.

Example 19 is the system of example 11 that may optionally include that transactions of the plurality of transactions comprise one or more invoices, charges, refunds, payments related to disputes.

Example 20 is one or more non-transitory computer readable storage media having instructions stored thereupon which, when executed by a system having at least a processor and a memory therein, cause the system to perform operations comprising: tracking, by a network commerce system, a plurality of transactions; determining one or more revenue recognition rules of a plurality of revenue recognition rules that applies to each transaction of the plurality of transactions based on results of matching performed between conditions of each of the plurality of revenue recognition rules and one or more characteristics of said each transaction, the conditions of each rule including an effective time period during which individual transactions are subject to the rule; and automatically performing revenue recognition for each transaction according to one of the one or more revenue recognition rules determined to apply to said each transaction using based on results of matching conditions of one revenue recognition rule and the one or more characteristics of said each transaction.

Example 21 is the one or more or more non-transitory computer readable storage media of example 20 that may optionally include that at least one revenue recognition rule of the plurality of revenue recognition rules includes two or more treatments that specify total revenue of a transaction matching conditions of said at least revenue recognition rule is allocated in two or more different revenue recognition allocations.

Example 22 is the one or more or more non-transitory computer readable storage media of example 20 that may optionally include that the method further comprises: displaying a user interface (UI); receiving entry of user inputs into the UI, the user inputs specifying conditions and one or more treatments indicating revenue recognition for an amount associated with each transaction that matches the conditions; creating a new revenue recognition by automatically converting the user inputs into the new rule; and adding the new rule to the plurality of revenue recognition rules.

Example 23 is the one or more or more non-transitory computer readable storage media of example 22 that may optionally include that at least one of the conditions of at least one rule specifies one or more keywords in a line item on an invoice.

Example 24 is the one or more or more non-transitory computer readable storage media of example 22 that may optionally include that the user inputs specify revenue is treated with at least two allocations of revenue when a transaction matches the conditions of at least one rule of the plurality of revenue recognition rules.

Example 25 is the one or more or more non-transitory computer readable storage media of example 20 that may optionally include that the method further comprises: determining two or more revenue recognition rules of the plurality of revenue recognition rules applies to one transaction of the plurality of transactions; and selecting a single revenue recognition rule from the two or more revenue recognition rules to apply to the one transaction based on a hierarchy, wherein the hierarchy is specified according to order number in an ordered listing of the rules in the plurality of revenue recognition rules.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   transmitting, by a server to a user device, a user interface for display on the user device to receive user inputs;
   receiving, by the server, user inputs from a user specifying components of a set of sub-conditions associated with a new condition to be added to an existing set of conditions, wherein the existing set of conditions is implemented on operations of the server, wherein each respective operation is associated with a respective value, and each respective condition of the existing set of conditions allocates the respective value of the respective operation into one or more classes when the respective condition is met; and
   in response to receiving the user inputs:
      transforming, by the server, the user inputs into the new condition;
      automatically adding the new condition to the existing set of conditions;
      tracking, by the server, a particular operation;
      determining, by the server, a value associated with the particular operation;
      identifying, by the server, one or more conditions from the existing set of conditions to be implemented on the particular operation;
      allocating, by the server, the value associated with the particular operation into one or more classes based in part on the identified one or more conditions; and
      providing, to the user device for display responsive to receipt of the user inputs, information identifying the particular operation and the one or more classes to which the value associated with the particular operation was allocated.

2. The method of claim 1, wherein:
   each of the one or more conditions of the existing set of conditions is assigned a rank; and
   the condition possessing a highest rank of the identified one or more conditions is implemented on the particular operation.

3. The method of claim 1, wherein:
   each of the one or more conditions of the existing set of conditions is uniquely numbered; and
   the condition possessing a lowest number of the identified one or more conditions is implemented on the particular operation.

4. The method of claim 1, wherein each of the one or more conditions in the existing set of conditions comprises the set of sub-conditions to be met to trigger a respective implementation of the one or more conditions.

5. The method of claim 1, wherein identifying the one or more conditions from the existing set of conditions to be implemented on the particular operation comprises:
   determining a set of attributes associated with the particular operation; and
   determining whether the set of attributes associated with the particular operation satisfies at least one or more sub-conditions in the set of sub-conditions associated with the condition.

6. The method of claim 5, wherein a sub-condition in the set of sub-conditions specifies one or more keywords associated with the particular operation.

7. The method of claim 1, wherein each of the one or more conditions of the existing set of conditions allocates the value associated with the particular operation into at least two classes.

8. The method of claim 5, wherein identifying the one or more conditions from the existing set of conditions to be implemented on the particular operation comprises:
   determining that the particular operation satisfies an effective time period associated with the particular operation.

9. The method of claim 1, wherein the user inputs specifying components of the set of sub-conditions further comprise;
   an effective time period associated with the operations of the server.

10. The method of claim 9, wherein the effective time period comprises at least one of:
   a finalization time associated with the particular operation; or
   a creation time associated with the particular operation.

11. A system comprising:
   a memory; and
   one or more processors coupled to the memory to:
      transmitting to a user device, a user interface for display on the user device to receive user inputs;

receive user inputs from a user specifying components of a set of sub-conditions associated with a new condition to be added to an existing set of conditions, wherein the existing set of conditions is implemented on operations of the system, wherein each respective operation is associated with a respective value, and each respective condition of the existing set of conditions allocates the respective value of the respective operation into one or more classes when the respective condition is met; and in response to receiving the user inputs:
transform the user inputs into the new condition;
automatically adding the new condition to the existing set of conditions;
track, by the processors, a particular operation;
determine, by the processors, a value associated with the particular operation;
identify, by the processors, one or more conditions from the existing set of conditions to be implemented on the particular operation;
allocate, by the processors, the value associated with the particular operation into one or more classes based in part on the identified one or more conditions; and
provide to the user device for display responsive to receipt of the user inputs, information identifying the particular operation and the one or more classes to which the value associated with the particular operation was allocated.

12. The system of claim 11, wherein each condition of the existing set of conditions is assigned a rank, further comprising:
apply, to the particular operation, the conditions possessing a highest rank of the identified one or more conditions.

13. The system of claim 11, wherein each condition of the existing set of conditions is uniquely numbered, further comprising:
apply, to the particular operation, the condition possessing a lowest number of the identified one or more conditions.

14. The system of claim 11, wherein each of the one or more conditions in the existing set of conditions comprises a respective set of sub-conditions to be met to trigger a respective implementation of the one or more conditions.

15. The system of claim 11, wherein identifying the one or more conditions from the existing set of conditions to be implemented on the particular operation comprises:
determining a set of attributes associated with the particular operation; and
determining whether the set of attributes associated with the particular operation satisfies at least one or more sub-conditions in the set of sub-conditions associated with the condition.

16. The system of claim 15, wherein a sub-condition in the set of sub-conditions specifies one or more keywords associated with the particular operation.

17. The system of claim 11, wherein each of the one or more conditions in the existing set of conditions allocates the value associated with the particular operation into at least two classes.

18. The system of claim 11, wherein identifying the one or more conditions from the existing set of conditions to be implemented on the particular operation comprises:
determining that the particular operation satisfies an effective time period associated with the particular operation.

19. The system of claim 18, wherein the user inputs specifying the set of sub-conditions further comprise the effective time period associated with the operations of the system.

20. A non-transitory computer-readable storage media having instructions stored thereupon which, when executed by a server having at least a processor and a memory therein, cause the server to perform operations comprising:
transmitting to a user device, a user interface for display on the user device to receive user inputs;
receiving user inputs from a user specifying components of a set of sub-conditions associated with a new condition to be added to an existing set of conditions, wherein the existing set of conditions is implemented on operations of the server, wherein each respective operation is associated with a respective value, and each respective condition of the existing set of conditions allocates the respective value of the respective operation into one or more classes when the respective condition is met; and
in response to receiving the user inputs:
transforming the user inputs into the new condition;
automatically adding the new condition to the existing set of conditions;
tracking, by the server, a particular operation;
determining, by the server, a value associated with the particular operation;
identifying, by the server, one or more conditions from the existing set of conditions to be implemented on the particular operation;
allocating, by the server, the value associated with the particular operation into one or more classes based in part on the identified one or more conditions; and
providing, to the user device for display responsive to receipt of the user inputs, information identifying the particular operation and the one or more classes to which the value associated with the particular operation was allocated.

* * * * *